Patented June 3, 1930

1,761,341

UNITED STATES PATENT OFFICE

EUGENE C. HERTHEL, OF CHICAGO, ILLINOIS, ASSIGNOR TO SINCLAIR REFINING COMPANY, OF NEW YORK, N. Y., A CORPORATION OF MAINE

MANUFACTURE OF ACID EXTRACTS, ALCOHOLS, AND THE LIKE FROM GAS OR VAPOR MIXTURES

No Drawing.      Application filed January 7, 1928.  Serial No. 245,268.

This invention relates to an improved process for the manufacture of acid extract, alcohols and other organic derivatives of value from hydrocarbon gas and vapor mixtures containing unsaturated constituents and in particular from by-product still gases from petroleum refining operations.

The invention provides a novel process for the selective treatment of components of gas or vapor mixtures containing unsaturated hydrocarbons, for the manufacture of alcohols or other organic derivatives of value, with a treating agent in such a manner that a maximum amount of the components of the gas mixture suitable for the manufacture of the desired product is recovered and a minimum amount of the treating agent is required to effect the desired conversion of the selected unsaturated hydrocarbons, while at the same time permitting accurate control of the reaction between the treating agent and the hydrocarbon compounds undergoing conversion.

The invention is of particular value and application in the treatment of pressure still tail gases for the production of amyl and butyl alcohols or mixtures of higher alcohols containing a preponderance of amyl and butyl alcohols.

According to the improved process of the invention a gas or vapor mixture containing unsaturated hydrocarbon constituents is treated with an acid resistant oil under such conditions as to effect a selective absorption of the unsaturated hydrocarbon, for example, by scrubbing the gas or vapor mixture with the acid resistant oil, the scrubbing operation being carried out under pressure or with a restricted quantity of the scrubbing medium and the absorbed hydrocarbons thereafter treated with sulphuric acid under sulphating conditions while still in solution in such absorbent. The sludge formed may then be separated from the acid resistant oil and water added to effect hydrolyzation of the alkyl esters of sulphuric acid and produce the corresponding alcohols, or the separated acid reaction products may be treated with alkali solutions of fatty acids, such for example as sodium acetate, for the production of esters.

In practicing the improved process of the invention for the production of alcohols, the alcohols may be recovered from the hydrolyzed acid extract by neutralizing the excess acid, for example, by adding a dilute solution of caustic alkali in a sufficiently restricted amount to avoid any excess of the alkali after neutralization, followed by distillation, or by diluting the acid extract with a solvent for the alcohols immiscible with oil followed by settling and layer separation or by any of the customary methods of extraction.

While the process of the invention is of more or less general application in the treatment of gas or vapor mixtures, it is of especial value and application in the treatment of gases and uncondensed vapors of the general character produced in pressure cracking operations and the invention will be further described in connection therewith.

In cracking operations for the production of low boiling constituents of a gasoline character from heavy hydrocarbon oils, in which the cracked products are taken off as a mixture of vapors and gases, either from the cracking operation itself or from some subsequent operation carried out to separate the lighter cracked products from residues the constituents of which are unsuitable as components of the desired gasoline character product, the mixture usually includes vapors of the desired low boiling distillate, gases uncondensible except under high pressures and low temperatures, and constituents in gas or vapor form of an intermediate character. These intermediate constituents usually include both saturated and unsaturated hydrocarbons. After the usual condensing operation wherein the constituents suitable as components of the desired low boiling distillate are recovered as liquids, it is customary to treat the remaining uncondensed vapors and gases for further recovery of the intermediate constituents by compression or absorption. In treatment of these mixtures of uncondensed vapors and gases by scrubbing with an absorbent oil, it has been found that the heavier unsaturated constituents may be selectively absorbed. This action is apparently due to the fact that the heavier unsaturated constituents tend to displace the lighter constituents particularly when the scrubbing operation is conducted under pressure or when the absorbent capacity is limited. At any rate, when absorbing operations of this character are carried out under pressure or with a limited absorbent capacity the absorbed constituents contain a predominance of heavier unsaturated compounds. A further concentration of the heavier unsaturated hydrocarbons in the absorbent medium may be effected by driving off the lighter components by rectification.

In practicing the improved process of the invention a suitable absorbent oil having the desired boiling point range which has been treated to remove all constituents reactive with sulphuric acid, for example, an oil which has been previously treated with sulphuric acid of the same or greater strength than the acid to be subsequently used in effecting sulphation of unsaturated compounds from the gas or vapor mixture or an oil which has been suitably treated with liquid sulphur dioxide in the well known manner, such as that proposed by Edeleanu, or any other oil which has been rendered non-reactive to sulphuric acid such as certain well known mineral medicinal oils, is employed as the absorbing medium in a scrubbing operation which is carried out as above described to effect the selective absorption of the heavier unsaturated hydrocarbons therein, and the acid resistant absorbent medium with the absorbed constituents contained therein thereafter intimately admixed with sulphuric acid. The temperature of the mixture and the strength of the sulphuric acid solution employed should be so regulated as to insure sulphation of the unsaturated hydrocarbons and to avoid sulphonation or polymerization of the more unstable unsaturated compounds with the accompanying formation of tarry residues and decrease in the yield of desirable alkyl esters of sulphuric acid. Ordinarily sulphation may be promoted by using a sulphuric acid solution of about 1.8 specific gravity and by cooling the mixture during the acid treatment so as to maintain the temperature of the mixture below 75° F. In general, the greater the strength of the sulphuric acid solution employed the lower will be the temperature required to avoid polymerization. Cooling may be effected by circulating a cooling medium through suitable cooling coils arranged within the body of charged absorbent during the acid treatment.

The acid treatment may to advantage be effected in a series of steps employing acid solutions of progressively increasing strength in each succeeding treatment while permitting the reaction products to settle and withdrawing the sludge so formed between successive treatments. By subjecting the selectively absorbed unsaturated compounds to acid treatment while in solution in the absorbent medium, accurate control of the sulphating reaction may be maintained and a milder action of the acid on the more unstable compounds which are more readily polymerized is promoted. The comparatively mild action of the sulphuric acid solution on the unsaturated hydrocarbons while in a more or less dilute solution in the absorbing oil makes it possible to use a more concentrated acid and accordingly to obtain a more thorough sulphation of the absorbed hydrocarbons without effecting excessive polymerization, particularly where the acid treatment is carried out in successive steps. For example, the charged absorbent oil may to advantage be subjected to successive acid treatments using an aqueous solution of 40–50% sulphuric acid, adding the acid slowly over a period of thirty minutes and agitating the mixture for about fifteen minutes after all of the acid has been added, thereafter allowing the sludge to settle, withdrawing the settled sludge and following this treatment by successive similar treatments using sulphuric acid solutions of 70–80%, and 80–90% sulphuric acid respectively. In some cases a final treatment using an even stronger acid may be given.

The acid extracts so obtained may be separately treated with water to effect hydrolyzation of the alkyl esters of sulphuric acid and form the corresponding alcohols, or the acid extracts obtained from the different acid treatments may be collected together and the mixture treated with water to obtain a mixture of the corresponding alcohols.

In the practice of the process of the invention to produce a mixture of alcohols containing largely amyl and butyl alcohols, the mixture of uncondensed vapors and gases discharged from commercial pressure cracking operations for the production of pressure distillates suitable for use as motor fuels in internal combustion engines may be subjected to scrubbing treatment using an acid resistant oil as the scrubbing medium. The scrubbing treatment may advantageously be carried out under substantially the same pressure as that prevailing in the pressure still or at a pressure intermediate that prevailing in the still at atmospheric pressure and the absorbent oil supplied to the scrubbing operation at a rate considerably less than that required to absorb all of the readily absorbable components of the gas and vapor mixture. The constituents contained in the charged absorbing oil under such conditions will contain a predominance of unsaturated hydrocarbons and a proportionately greater amount of amylene and butylene. The ratio of amylene and butylene to the entire quantity of absorbed constituents may be still further increased by subjecting the charged absorbent medium to a rectifying treatment, and thereby driving off a large percentage of the absorbed ethylene and propylene. The partially charged absorbent may then be subjected to treatment with sulphuric acid, the sludge settling and hydrolyzation of the acid reaction products obtained by adding water to the separated sludge as above described.

The acid resistant oil after separating the sludge formed by the action of the acid on the absorbed constituents contained therein may be used again as an absorbing medium to effect further absorption of the heavier unsaturated constituents from gas or vapor mixtures.

If difficulty is encountered in securing a clean separation of the acid resistant oil and the acid or acid reaction products, separation may be promoted by slightly warming the mixture or by diluting the mixture with an acid resistant diluent such as benzol. The presence of a small amount of the acid resistant oil in the sludge when water is added to the acid reaction products to effect hydrolysis does no particular harm if the absorbent oil has an appropriate boiling point range as the alcohols may be separated by distillation. The sludge, however, should be first separated from the main body of oil before caustic or water is added as hydrolyzation tends to throw the alcohols in the oil.

The process of the invention has the further advantage that the lighter constituents of the gas or vapor mixture are displaced from the oil before contact with the acid. Thus a decreased amount of acid is required to effect the desired conversion of the heavier unsaturated components and entrainment of the acid or acid reaction products in the lighter components is avoided. The lighter constituents so displaced may, if desired, be further treated for the recovery of organic derivatives or the unabsorbed components of the gas or vapor mixture may be subjected to a further absorbing treatment wherein an excess of the absorbing medium is employed. Pressure still charging stock may to advantage be used as the absorbing medium in a further absorbing treatment and the charged absorbent medium from the further absorbing operation therafter subjected to cracking treatment. The gases or vapors remaining unabsorbed or displaced from the absorbent medium in the first absorbing operation may, however, be passed to a suitable storage receptacle or utilized for fuel or any other desired purpose without further treatment.

Where the charged acid resistant absorbent oil from the first absorbing treatment is to be subjected to a stabilizing treatment to remove the lighter constituents contained therein, the lighter components driven off by the stabilizing treatment may to advantage be subjected to a further absorbing treatment together with the lighter components remaining unabsorbed or uncondensed, or displaced from the charged absorbent medium in the first absorbing operation.

It is a further advantage of the process of the invention that the liquid to liquid contact obtained by treating the unsaturated constituents absorbed from the gas and vapor mixture while still in solution in the absorbing oil promotes a more intimate mixture and a more thorough and uniform reaction than it is possible to obtain when gas and liquid contacting of the active elements is relied upon. The distribution of the absorbed components of the gas and vapor mixture throughout a considerable body of the absorbing medium also promotes accurate regulation of the temperature and prevents local overheating which it would be almost impossible to eliminate if the gases were to be contacted directly with the acid.

I claim:

1. In the treatment of gas and vapor mixtures containing unsaturated hydrocarbons for the production of acid extracts containing alkyl esters of sulphuric acid, the improvement comprising absorbing unsaturated hydrocarbons from the gas or vapor mixture in an acid resistant oil and thereafter subjecting the absorbed constituents to treatment with sulphuric acid under sulphating conditions while in solution in said acid resistant oil.

2. In the treatment of gas and vapor mixtures containing unsaturated hydrocarbons for the production of acid extracts containing alkyl esters of sulphuric acid, the improvement comprising intimately contacting the gas or vapor mixture with an acid resistant oil under superatmospheric pressure, whereby a preponderance of the heavier unsaturated hydrocarbons are selectively absorbed in the acid resistant oil, and thereafter subjecting the absorbed constituents to treatment with sulphuric acid under sulphating conditions while in solution in said acid resistant oil.

3. In the treatment of gas and vapor mixtures containing unsaturated hydrocarbons for the production of acid extracts containing alkyl esters of sulphuric acid, the improvement comprising intimately contacting the gas or vapor mixture with an acid resistant oil and restricting the amount of oil supplied to said contacting operation, whereby a preponderance of unsaturated hydrocarbons are selectively absorbed in said acid resistant oil, thereafter subjecting the absorbed constituents to treatment with sulphuric acid under sulphating conditions while in solution in said acid resistant oil.

4. In the treatment of gas and vapor mixtures containing unsaturated hydrocarbons for the production of acid extracts containing alkyl esters of sulphuric acid, the improvement comprising intimately contacting the gas or vapor mixture with an acid resistant oil and subsequently subjecting the oil with absorbed constituents contained therein to a rectifying treatment whereby the lighter absorbed constituents are driven off, and thereafter subjecting the remaining absorbed constituents to treatment with sulphuric acid under sulphating conditions while in solution in said acid resistant oil.

5. In the treatment of gas and vapor mixtures containing unsaturated hydrocarbons for the production of alcohols therefrom, the improvement comprising intimately contacting the gas or vapor mixture with an acid resistant oil, thereafter subjecting the absorbed constituents to treatment with sulphuric acid under sulphating conditions while in solution in said oil, separating the acid reaction products as a sludge from the main body of acid resistant oil and adding water to the sludge so separated.

In testimony whereof, I have subscribed my name.

EUGENE C. HERTHEL.